Aug. 27, 1935. A. H. RINEY ET AL 2,012,351
PIPE LINE
Filed July 28, 1932
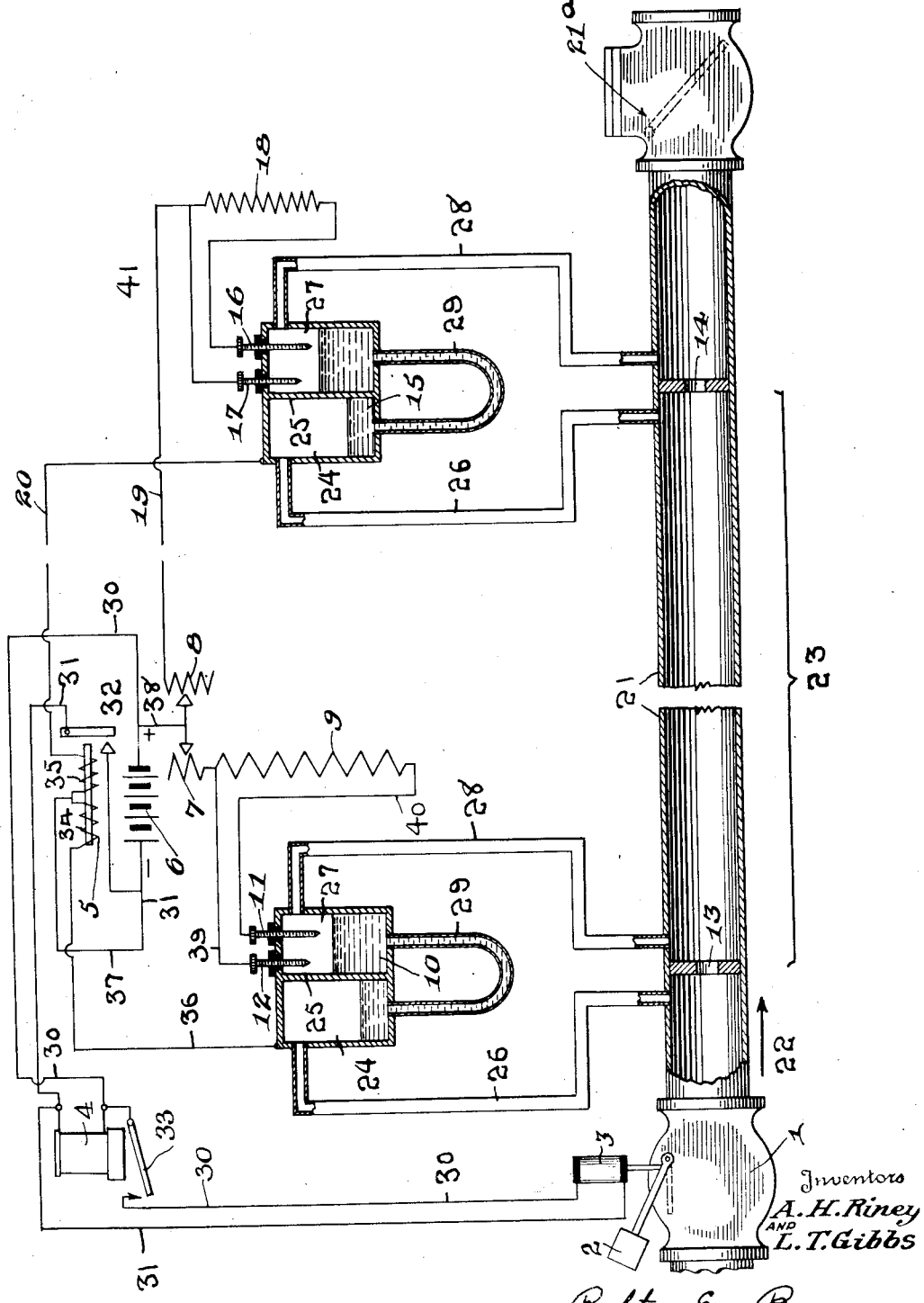
Inventors
A. H. Riney
AND
L. T. Gibbs
By Robt. E. Barry
Attorney Patented Aug. 27, 1935

2,012,351

UNITED STATES PATENT OFFICE 2,012,351

PIPE LINE

Arthur H. Riney and Lloyd T. Gibbs, Bartlesville, Okla., assignors, by direct and mesne assignments, of one-half to Phillips Petroleum Company of Bartlesville, Okla., a corporation of Delaware, and one-half to Ford, Bacon and Davis, Inc., New York, N. Y., a corporation of New Jersey Application July 28, 1932, Serial No. 625,456

14 Claims. (Cl. 137—139)

This invention relates to improvements in pipe lines for conducting and distributing gases, liquids and like fluids and to means for automatically controlling the flow of fluid through the pipe lines.

The invention has for its object to provide an arrangement for use in connection with pipe lines particularly in cases where such lines cross railways or run through or near valuable property which will automatically operate to interrupt the flow of fluid through the pipe line in case of a leak or break therein and thereby avoid damage to life and property.

A further object of the invention consists in the provision of pressure or flow devices arranged at the ends of the section of the pipe line to be protected and connected with each other by suitable means whereby the pressure or flow of fluid, as the case may be, is in balance under all normal conditions but out of balance in case of a leak in the pipe section, the pressure or flow devices being connected with a control valve interposed in the pipe line to operate the valve in response to differential pressure conditions existing in the pressure or flow devices so as to interrupt the flow of fluid through the pipe line and thereby prevent serious loss of gas or other fluid as well as lessen the hazzard connected with such loss.

A further object of the invention is the provision of the arrangement of this character in which the actuation of the valve is accelerated in the case of a leak or break of a serious nature so as to instantaneously effect closure of the valve.

A further object of the invention is the provision of an arrangement for varying the responsiveness of the pressure and flow devices to the variations in flow of fluid through the pipe line.

In the accompanying drawing wherein an approved embodiment of the invention is illustrated:

The figure is a fragmentary detail of a pipe line partly in section and showing the invention applied thereto.

Referring to the drawing in detail, the numeral 21 indicates a pipe line for conducting gas, liquid or other fluid through which the liquid passes in the direction of the arrow 22. At the beginning of the section of the pipe 21 which is to be protected an orifice plate 13 is positioned therein and at the downstream side of the protected section a second orifice plate 14 is inserted in the pipe. Immediately in advance of the protected section indicated at 23, a shut-off valve 1 is interposed in the pipe 21 for controlling the passage of fluid therethrough.

The distance between the orifice plates 13 and 14 depends upon the length of the section to be protected and a check valve 21a is located in the pipe 21 at the downstream side of the section 23 to prevent the backflow of fluid into the section 23 following the closing of the valve 1 in response to leakage in said section.

Pressure responsive devices 10 and 15 are connected with the pipe 21 on opposite sides of the orifice plates 13 and 14, respectively. The upstream side of the orifice plate 13 is connected with the chamber 24 at one side of the partition 25 arranged in the device 10 by a pipe 26 while the pipe 21 is connected on the downstream side of the plate 13 with the other chamber 27 by a second pipe 28. The two chambers 24 and 27 contain mercury and are in communication with each other by a depending U-tube 29. The difference in pressure existing in the pipe 21 on the up and downstream sides of the plate 13 is indicated by the difference in the level of the mercury in the container of the pressure responsive device 10.

The chambers 24 and 27 of the other pressure responsive device 15 are connected with the pipe 21 on the up and downstream sides of the plate 14 in identically the same manner as the above described pressure responsive device 10, and therefore the same numerals have been used to indicate corresponding parts on both pressure responsive devices.

The valve 1 is automatically closed by a weighted arm 2 upon energization of the motor or magnet device 3 current for which device is supplied by a battery or other source of current 6. The conductor leading from the positive pole of the battery 6 is indicated at 30 and is connected at its opposite end with one pole of the magnet 3. The negative pole of the source of current 6 is connected with the opposite pole of the magnet 3 by a conductor 31. Under normal conditions the flow of current from the source of energy 6 to the magnet 3 is interrupted at the point designated at 32 where the armature of the differential relay 5 is spaced from the stationary contact and at the point 33 where the armature of a retarded relay 4 normally interrupts the flow of current over the conductor 30. The coil of the retarded relay 4 is shunted across the conductors 30 and 31 and is energized when the circuit is closed at 32 and at the expiration of the selected period the retarded relay 4 closes the conductor 30 at the point 33 and the magnet 3 is energized, resulting in the automatic closure of the valve 1.

One coil 34 of the differential relay 5 is connected at one end by a conductor 36 with the conducting body of the container of the pressure responsive device 10. On the other hand, one end of the other coil 35 of the differential relay is connected by a conductor 20 with the pressure responsive device 15. The adjacent terminals of the two coils 34 and 35 are connected by a common return wire 37 with the negative pole of the source of current 6.

The positive pole of the source of current 6 is connected by a conductor 38 through a variable resistance 7 and a conductor 39 with a contact screw 12 threaded in and insulated from the container of the pressure responsive device 10. A fixed resistance 9 is connected with the variable resistance 7 and is connected by a conductor 40 with a second contact screw 11 also fitted in and insulated from the device 10. The two contacts 11 and 12 are adjusted so as to normally lie above the level of the mercury in the chamber 27 and are so disposed that contact is made by the mercury first with the contact 11 and then with the contact 12.

Contact members 16 and 17 identical in construction with the contact members 11 and 12 above described are mounted in the pressure responsive device 15, the contact member 17 being connected by a conductor 41 and a variable resistance 8 with the positive conductor 38 and the other adjustable contact member 16 being connected with the conductor 41 through a fixed resistance 18.

Under normal conditions the mercury in the two pressure responsive devices 10 and 15 does not touch the contacts 11—12 and 16—17, but in case of a break or leak at some point in the section 23 between the two orifice plates 13 and 14 the rate of flow from the orifice plate 13 will not be equal to that through the plate 14 and consequently the mercury will rise in the device 10 and touch either the contacts 11 or 11 and 12. If the mercury touches the contact 11 the circuit is closed from the positive pole of the source of current 6 through the conductor 38, resistances 7 and 9, conductor 40, contact 11, mercury of the pressure responsive device 10, the conductor 36, coil 34 and conductor 37 to the negative pole of the current source. The coil 34 being thus energized, the armature of the relay 5 is attracted and a contact is established at 32 closing the circuit to the coil of the retarding relay 4 over the conductors 30 and 31. If this condition is maintained for a time corresponding to the retardation of the relay 4, the latter will operate to close the contacts 33 and thereby energize the control magnet 3 and operate to close the valve 1 thereby interrupting the flow of fluid through the pipe 21.

The arrangement is rendered sensitive to small leaks in the pipe line by so adjusting the contacts 11 and 16 that they are normally disposed only a small fraction of an inch above the level of the mercury. In case the flow increases to a point where the mercury in the device 10 touches the contact 11, the same condition will exist in the device 15 and the mercury will also touch the contact 16 thereof. In this case the same amount of current flows over the conductors 36 and 20 to the two coils 34 and 35 of the differential relay 5; thus the latter will not operate to close the contacts at 32. As stated, the resistances 7 and 8 are variable and may be regulated to keep the circuits of the two pressure responsive devices 10 and 15 in balance under normal conditions. In case the break in the pipe section 23 is severe, the mercury in one or the other of the pressure responsive devices 10 or 15 instantaneously rises and touches either the contact 12 or 17, according to which of the two devices is operated and the direction of flow of the fluid in pipe 21, and in this case the fixed resistance 9 or 18 of the associated pressure responsive device is shorted out of the circuit thus serving to further unbalance the current passing through one half of the coil 5 and rendering the action of the relay more positive.

What I claim is:

1. In combination, a fluid conducting pipe, pressure responsive devices connected with said pipe at different points in the length thereof, a normally open shut off valve interposed in said pipe in advance of the pressure responsive devices with respect to the direction of flow through said pipe, and means responsive to differential variations in pressure conditions to which either one of said devices may be subjected, to totally close said valve.

2. In combination, a fluid conducting pipe, pressure responsive devices connected with said pipe at different points in the length thereof, a normally open fluid shut-off valve interposed in said pipe in advance of the pressure responsive devices with respect to the direction of flow through said pipe, and adjustable means responsive to differential variations in pressure conditions to which either one of said devices may be subjected, to totally close said valve and maintain the latter in closed position.

3. In combination, a fluid conducting pipe, pressure responsive devices connected with said pipe at different points in the length thereof, a normally open fluid shut-off valve interposed in said pipe, means responsive to differential variations in pressure conditions to which either one of said devices may be subjected, to totally close said valve, and means for retarding the action of the last mentioned means.

4. In combination, a fluid conducting pipe, pressure responsive devices connected with said pipe at different points in the length thereof, a normally open fluid shut-off valve interposed in said pipe in advance of the pressure responsive devices with respect to the direction of flow through said pipe, means to totally close said valve and maintain the latter is closed position, and means responsive to differential variations in pressure conditions to which either one of said devices may be subjected to control said valve closing means.

5. In combination, a fluid conducting pipe, pressure responsive devices connected with said pipe at different points in the length thereof, a normally open fluid shut-off valve interposed in said pipe, means to totally close said valve and maintain the latter in closed position, and means responsive to differential variations in pressure conditions to which either one of said devices may be subjected to control said valve closing means, said last mentioned means being adjustable for varying its responsiveness.

6. In combination, a fluid conducting pipe, pressure responsive devices connected with said pipe at different points in the length thereof, a normally open fluid shut-off valve interposed in said pipe, means to totally close said valve, means responsive to differential variations in pressure conditions to which either one of said devices may be subjected, to actuate said valve closing means, said last mentioned means including normally balanced electric circuits respectively including resistances, and means for varying the resistances in the respective circuits in accordance with differential variations in pressure conditions in said pressure responsive devices to actuate said valve closing means.

7. In combination, a fluid conducting pipe, pressure responsive devices connected with said pipe at different points in the length thereof, a fluid shut-off valve interposed in said pipe, means to actuate said valve, means responsive to differential variations in pressure conditions to which either one of said devices may be subjected, to operate said valve actuating means, said last mentioned means including normally balanced electric circuits respectively including resistances, means for varying the resistances in the respective circuits in accordance with differential variations in pressure conditions in said pressure responsive devices to control said actuating means, and adjustable resistances in said circuits for bringing the latter into balance.

8. In combination, a fluid conducting pipe, pressure responsive devices connected with said pipe at different points in the length thereof, a fluid shut off valve interposed in said pipe, means to actuate said valve, means responsive to differential variations in pressure conditions to which either one of said devices may be subjected, to operate said valve actuating means, said last mentioned means including electric circuits associated with the respective pressure control devices, each circuit including a resistance, and means operated in response to a critical pressure difference between the two pressure responsive devices to short circuit either resistance.

9. In combination, a fluid conducting pipe, pressure responsive devices connected with said pipe at different points in the length thereof, a fluid shut-off valve interposed in said pipe, means to actuate said valve, means responsive to differential variations in pressure conditions to which either one of said devices may be subjected to operate said valve actuating means, and means for retarding the actuation of said valve.

10. In combination, a fluid conducting pipe, pressure responsive devices connected with said pipe at different points in the length of the latter and each including a column of electrical conducting liquid moving under the influence of the fluid pressure in said pipe, a fluid shut-off valve in said pipe, means to actuate said valve, and means to operate the actuating means, said operating means including circuits associated with the respective pressure responsive devices and controlled by the columns of liquid therein.

11. In combination, a fluid conducting pipe, pressure responsive devices connected with said pipe at different points in the length of the latter and each including a column of electrical conducting liquid moving under the influence of the fluid pressure in said pipe, a fluid shut-off valve in said pipe, means to actuate said valve, and means to operate the actuating means, said last mentioned means including circuits associated with the respective pressure responsive devices and controlled by the columns of liquid therein, said circuits being normally maintained in balance during corresponding variations in pressure and flow conditions in the fluid conducting pipe at the points of connection therewith of the pressure responsive devices, and acting in response to a difference in pressure and flow conditions to effect operation of the actuating means.

12. In combination, a fluid conducting pipe, pressure responsive devices connected with said pipe at different points in the length thereof, a fluid shut-off valve interposed in said pipe, actuating means for said valve including an electric circuit and a differential relay interposed therein, and means responsive to differential variations in pressure conditions to which either one of said devices may be subjected to energize said differential relay.

13. In combination, a fluid conducting pipe, pressure responsive devices connected with said pipe at different points in the length thereof, a fluid shut-off valve interposed in said pipe, actuating means for said valve including an electric circuit and a differential relay interposed therein, means responsive to a pressure difference in said devices to energize said differential relay, said differential relay acting to prevent actuation of said valve in response to corresponding variations in the two pressure responsive devices.

14. In combination, a fluid conducting pipe, pressure responsive devices connected with said pipe at different points in the length thereof, a normally open fluid shut-off valve interposed in said pipe in advance of the pressure responsive devices with respect to the direction of flow through said pipe, means for operating said valve from either pressure responsive device in response to pressure variations existing in said pipe, and means for preventing actuation of said valve when the pressure acting on the two pressure responsive devices corresponds.

ARTHUR H. RINEY.
LLOYD T. GIBBS.